United States Patent [19]

Bausch et al.

[11] Patent Number: 4,924,670

[45] Date of Patent: May 15, 1990

[54] HYDRAULIC UNIT FOR A MOTOR VEHICLE

[75] Inventors: Paul Bausch, Hattenheim; Hans-Peter Hemmer, St. Augustin, both of Fed. Rep. of Germany

[73] Assignee: General Motors Corporation, Detroit, Mich.

[21] Appl. No.: 229,840

[22] Filed: Aug. 8, 1988

[30] Foreign Application Priority Data

Aug. 13, 1987 [DE] Fed. Rep. of Germany ....... 3726979

[51] Int. Cl.[5] .............................................. F16D 31/02

[52] U.S. Cl. ...................................... 60/418; 417/490; 417/540

[58] Field of Search ..................... 60/415, 418; 417/38, 417/36, 490, 569, 541, 543

[56] References Cited

U.S. PATENT DOCUMENTS

| | | | |
|---|---|---|---|
| 2,540,357 | 3/1946 | Stanley | 417/415 |
| 4,278,403 | 7/1981 | Shafer | 417/38 |
| 4,417,857 | 11/1983 | Südbeck | 417/490 |
| 4,738,595 | 4/1988 | Gaiser | 417/36 |

FOREIGN PATENT DOCUMENTS

| | | | |
|---|---|---|---|
| 8785 | 12/1955 | Fed. Rep. of Germany | 417/415 |
| 1047564 | 12/1958 | Fed. Rep. of Germany . | |
| 3133111 | 4/1983 | Fed. Rep. of Germany . | |

*Primary Examiner*—Edward K. Look
*Assistant Examiner*—John Ryznic
*Attorney, Agent, or Firm*—Saul Schwartz

[57] ABSTRACT

A hydraulic unit for a motor vehicle consisting of a housing comprising two housing chambers separated by a wall located inside the housing, in which a reciprocating pump is supported by the wall located inside the housing and is arranged in a first housing chamber which forms a hydraulic fluid reservoir. A drive member for the reciprocating pump is led out of the first housing chamber. A nonreturn valve provided in the wall located inside the housing establishes a fluid communication from the reciprocating pump to a pressure chamber in the second housing chamber, which is separated from a gas pressure reservoir also provided in the second housing chamber by a reservoir piston guided in the second housing chamber.

1 Claim, 1 Drawing Sheet

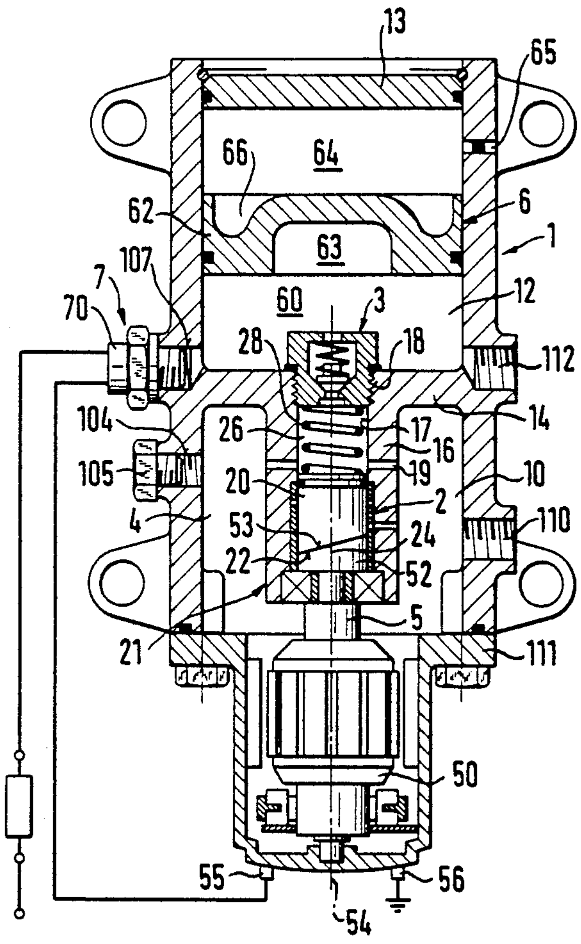
13
65
66
64
62
6
63
1
107
7
70
60
3
12
28
18
112
104
26
17
14
16
105
20
19
10
2
4
53
24
110
22
52
5
21
111
50
55
56
54

HYDRAULIC UNIT FOR A MOTOR VEHICLE

The present invention pertains to a hydraulic unit for a motor vehicle, comprising a hydraulic reservoir having an inlet, a pressure reservoir having an outlet for the hydraulic fluid, a reciprocating pump located between them, a nonreturn valve installed on the delivery side of this pump and a drive mechanism for the reciprocating pump.

Such hydraulic units are used to control hydraulically assisted operations in the motor vehicle, e.g., a power steering or a hydraulic clutch for a transmission case in four-wheel drive motor vehicles.

In these prior art hydraulic units, a reciprocating pump delivers the hydraulic fluid through a hydraulic line from a hydraulic fluid container, increases the fluid pressure and delivers the hydraulic fluid under increased pressure through compressed fluid lines via a nonreturn valve to the amplifiers actuated by the hydraulic system. A pressure reservoir, which is used both to compensate for the pressure shocks originating from the reciprocating pump and to store the pressure after the pump has been turned off, is connected to the compressed fluid line. The reciprocating pump may be actuated, e.g., via a cam arranged on a motor shaft or a drive shaft.

A disadvantage of hydraulic units of this type is the fact that they consist of a great number of components, so that they must be connected to each other by compressed fluid lines. On the one hand, these compressed fluid lines represent a disturbing flow resistance for the pressurized fluid, as a result of which additional work must be performed by the pump, and on the other hand, they are sources of error, since a multiple of connections between the individual components of the hydraulic unit and the pipes must be designed so as to hold pressure.

The task of the present invention is therefore to provide a hydraulic unit which is characterized by increased reliability of operation and function and has a particularly compact design.

This task is accomplished in that a housing comprising a first housing chamber and a second housing chamber is provided, which chambers are separated from each other by a common wall located inside the housing; that the reciprocating pump is supported by the wall located inside the housing, and the first housing chamber forming the hydraulic fluid reservoir is located in the wall; that the reciprocating pump delivers hydraulic fluid through the wall located inside the housing and through the nonreturn valve provided in the wall located inside the housing into the second housing chamber forming the pressure reservoir; and that a drive mechanism for the reciprocating pump is led out of the hydraulic fluid reservoir.

The extremely compact design, in which all the components which are necessary for functions are integrated within a housing, is advantageous in this hydraulic unit. The need for additional lines and discharge losses are avoided due to the reciprocating pump being accommodated in the hydraulic fluid reservoir, so that most of the energy taken up by the pump can be utilized to generate pressure. The compact design also leads to a reduction of possible sources of error which may be caused by connections. In addition, the design of the hydraulic unit according to the present invention leads to lower stocking costs in both automobile manufacture and spare parts sales, since it is no longer necessary to stock the individual components and pipes, but only the compact, completely assembled hydraulic unit, which can thus be handled as an exchange unit and be repaired centrally. Due to this compact design, the hydraulic unit is also suitable for use in different types of vehicles, so that only one hydraulic unit need be designed, manufactured and stocked for an entire series of vehicle modes.

In an especially advantageous design, the pump housing for the reciprocating pump is formed by the wall located inside the housing, as a result of which manufacture is further simplified and the number of components is also reduced.

The design makes it possible to build a very slender hydraulic unit, since the rotary movement of the drive member is directly transformed into a reciprocating movement of the piston due to the rotation of the drive member and the two oblique planes which are formed by the oblique end face of the actuating section and the oblique actuating surface of the pump piston, as well as to the nonrotating arrangement of the pump piston, so that the pump piston and the drive members can be disposed essentially coaxially.

The fact that the drive member is driven by means of an electric motor permits even more flexible use of the pump, since it can be disposed independently from the arrangement of the mechanical drive mechanisms in the motor vehicle, e.g., in the trunk space or in cavities on the lower side of the vehicle.

The fact that a gas pressure reservoir is provided as the pressure reservoir also makes the use of the hydraulic unit more flexible because hydraulic units of identical construction have different pressure reservoir properties due to the preselectable filling of the gas pressure reservoir at different gas pressures.

Due to the fact that the nonreturn valve can be screwed in, this valve can be replaced in the case of repair. In addition, the nonreturn valve can thus also be simply replaced by another nonreturn valve possessing different properties if a different pressure is to be generated by the reciprocating pump due to changes made on this pump.

A hydraulic unit possessing another advantageous characteristic, protection against destruction by excess pressure, is obtained due to the fact that a pressure limiter for the fluid pressure in the pressure chamber is provided. If the pressure limiter is a pressure switch for the electric motor, the electric motor can be actuated as desired both if the pressure is too high and if it is too low, and it can thus be either stopped to limit the pressure or started to increase the pressure, so that the pressure can be maintained at the necessary level due to the electric motor starting automatically, e.g., in the case of possible leaks in the pressurized system.

The design according to claim 11 permits simple manufacturing the housing as a cast part.

Further advantageous embodiments of the present invention are described in the remaining patent claims.

The present invention will be explained below in greater detail on the basis of examples with reference to the drawing, in which the single figure shows a schematic sectional view of the hydraulic unit according to the present invention.

A housing 1 of the hydraulic unit has a first housing chamber 10 as well as a second housing chamber 12, which are separated from each other by a wall 14 located inside the housing. The wall 14 located inside the housing has a central, essentially hollow, cylindrical section 16, which forms a pump housing 21 for a reciprocating pump 2. The hollow cylindrical section 16 with its bore 17 establishes communication between the first housing chamber 10 and the second housing chamber 12.

In the zone in which it opens into the second housing chamber 12, the bore 17 has an internal thread 18 into which a nonreturn valve 3 is screwed in a sealing manner, and thus, it permits flow through the bore 17 only from the first housing chamber 10 into the second housing chamber 12.

A pump piston 20 is also inserted nonrotatably in the hollow cylindrical bore 17, and this piston can be moved to and fro in the bore and has an actuating face 22 at its end face turned away from the nonreturn valve 3, thus end face extending obliquely to the axis 24 of the pump piston 20. A convenient arrangement for preventing rotation of the piston 20 in the cylindrical bore 17 is a pin, not shown, rigidly mounted on the cylindrical wall section 16 and projecting into a longitudinal groove, not shown, in the piston 20. A pump chamber 26 in which a compression spring 28 is arranged and supported by the pump piston 20 and the nonreturn valve 3 is defined between the pump piston 20 and the nonreturn valve 3. There is fluid communication between the pump chamber 26 and the first housing chamber 10 via two radial bores 19 in the wall of the hollow cylindrical section 16. Fluid is motivated through the bores 19 into the pump chamber 26 when the piston 20 is below the bores by gravity or by the mild vacuum above the piston created as the spring 28 pushes the piston 20 away from the valve 3.

A drive member 5 is mounted rotatably within the bore 17 in the zone in which the bore 17 opens into the first pump chamber 10, and the axis of rotation 54 of the drive member 5 is essentially coaxial with the piston axis 24. At its piston side end, the drive member has an actuating section 52 which has a piston side end face 53, which is also oblique relative to the axis of rotation 54, similar to the actuating surface 22 of the piston 20.

The actuating member 5 is led out of the first housing chamber 10 and is driven by an electric motor 50 which is arranged in a first housing lid 11. The first housing lid 11 is flanged onto the housing 1 and seals off the first housing chamber 10 from the outside. Two motor connections 55 and 56 for supplying the motor with electricity are provided on the housing lid 11.

A reservoir piston 62 is disposed in an axially displaceable manner in the second housing chamber 12. A pressure chamber 60, into which the nonreturn valve 3 opens, is thus created between the reservoir piston 62 and the wall located inside the housing. In its central area, the reservoir piston 62 has a cavity 63 on the pressure chamber side for receiving the section of the nonreturn valve 3 reaching into the pressure chamber 60 if the reservoir piston 62 is in contact with the wall 14 located inside the housing.

On the side of the housing 1 opposite the housing lid 11, a second housing lid 13 is placed into the second housing chamber 12 in a sealing manner and it defines between it and the reservoir piston 62 a partial space of the second housing chamber 12, which serves as a gas pressure reservoir 64. The gas pressure reservoir 64 can be filled via a bore 65 provided in the housing. The surface of the reservoir piston 62 on the gas pressure reservoir side has a ring-shaped depression 66.

In the zone of the pressure chamber side surface of the wall 14 located within the housing, a threaded bore 107 is drilled from the outside into the wall of the housing 1. A pressure switch 70, serving as a pressure limiter 7, is screwed into the threaded bore 107; one connection of this pressure switch is connected to the first motor connection 55, and the other connection of this pressure switch leads to the poles of a power source, like the second motor connection 56.

On the side of the threaded bore 107, a filling bore 104 leads in the zone of the first housing chamber 10 through the wall of the housing 1 and into the first housing chamber 10, and the housing chamber 10 serving as a hydraulic fluid reservoir 4 can be filled with hydraulic fluid through this filling bore. The filling bore 104 is sealed by a screw plug 105.

On the side of the housing opposite the bores 104 and 107, a threaded inlet bore 110, which permits hydraulic fluid to flow into the hydraulic fluid reservoir 4, is provided in the wall of the housing 1 in the zone of the first housing chamber 10. On the same side of the housing, a threaded outlet bore 112, which permits the pressurized hydraulic fluid to flow out of the pressure chamber 60, is provided for the pressure chamber 60 in the wall of the housing 1 in the area of the pressure chamber side end face of the wall 14 located inside the housing.

The embodiments of the invention in which an exclusive property or privilege is claimed are defined as follows:

1. A hydraulic pump and accumulator assembly comprising:

a tubular housing open at a first end and at a second end and including a center wall perpendicular to the longitudinal axis of the tubular housing, a first cover closing said first open end of said tubular housing and cooperating with said center wall in defining a first chamber in said tubular housing, a second cover closing said second end of said tubular housing and cooperating with said center wall in defining a second chamber in said tubular housing, means on said tubular housing for introducing into said second chamber a continuous supply of fluid at low pressure so that said second chamber defines a fluid reservoir of said pump and accumulator assembly, a piston slidably disposed in said first chamber in said tubular housing and cooperating with said first cover in defining a variable volume accumulator gas chamber and cooperating with said center wall in defining a variable volume accumulator fluid chamber, means on said tubular housing defining a discharge port from said accumulator fluid chamber, means on said tubular housing defining a gas charging port for introducing gas under pressure into said accumulator gas chamber, a cylindrical wall section in said second chamber integral with and perpendicular to said center wall and concentric with said tubular housing and cooperating with a portion of said center wall within said cylindrical wall section in defining a pump chamber, a pump in said cylindrical wall section including an input member rotatable about the longitudinal axis of said tubular housing and an output member exposed to said pump chamber and movable in the direction of the longitudinal axis of said tubular housing, means defining a plurality of holes in said cylindrical wall section between said reservoir and said pump chamber, a one way valve in said center wall between said pump chamber and said accumulator fluid chamber, and an electric motor in said second chamber having a rotor shaft aligned on the longitudinal axis of said tubular housing and connected to said rotary input member of said pump.

* * * * *